US006790907B2

(12) United States Patent
Takata et al.

(10) Patent No.: US 6,790,907 B2
(45) Date of Patent: Sep. 14, 2004

(54) CERAMIC SLURRY COMPOSITION AND MANUFACTURING METHOD THEREFOR

(75) Inventors: Masachika Takata, Yasu-gun (JP); Satoru Tanaka, Moriyama (JP); Makoto Miyazaki, Hirakata (JP)

(73) Assignee: Murata Manufacturing Co. Ltd. (JP)

( * ) Notice: Subject to any disclaimer, the term of this patent is extended or adjusted under 35 U.S.C. 154(b) by 345 days.

(21) Appl. No.: 09/894,036

(22) Filed: Jun. 28, 2001

(65) Prior Publication Data

US 2002/0019462 A1 Feb. 14, 2002

(30) Foreign Application Priority Data

Jun. 29, 2000 (JP) ........................................ 2000-195741
May 14, 2001 (JP) ........................................ 2001-142658

(51) Int. Cl.[7] ............................. C08K 3/10; C08K 3/22; C08K 3/24; C08L 31/02; C08L 33/06
(52) U.S. Cl. ........................ 524/833; 524/401; 524/413; 524/430; 524/431
(58) Field of Search ................................ 524/413, 401, 524/833

(56) References Cited

U.S. PATENT DOCUMENTS 5,772,953 A * 6/1998 Sambrook et al. .......... 264/638

6,004,705 A * 12/1999 Masaki et al. ................ 430/15

FOREIGN PATENT DOCUMENTS

| JP | 05-294712 | | 11/1993 |
| JP | 06-211562 | | 8/1994 |
| JP | 11-268959 | | 10/1999 |
| WO | WO 94/07808 | * | 4/1994 |

* cited by examiner

*Primary Examiner*—Tae H. Yoon
(74) *Attorney, Agent, or Firm*—Dickstein, Shapiro, Morin & Oshinsky, L.L.P.

(57) ABSTRACT

A ceramic slurry composition is obtained by mixing a ceramic raw material powder, a water-soluble acrylic binder and water, wherein the water-soluble acrylic binder has a weight average molecular weight of from about 10,000 to 500,000, and has an inertial square radius of not more than about 100 nm in water. The ceramic slurry composition can have a low viscosity as well as good dispersion characteristics for the ceramic raw material powder, good flow characteristics and good form characteristics, and can provide ceramic green sheets having a high density and excellent drying characteristics, by decreasing the solution viscosity, without decreasing the molecular weight of the water-soluble acrylic binder containing a hydrophobic component.

18 Claims, 1 Drawing Sheet

CERAMIC SLURRY COMPOSITION AND MANUFACTURING METHOD THEREFOR

BACKGROUND OF THE INVENTION

1. Field of the Invention

The present invention relates to a ceramic slurry composition for use in manufacturing ceramic green sheets and to a preferable method for manufacturing the composition. More particularly, the present invention relates to improvement of a binder for use in manufacturing the slurry from a ceramic raw material powder.

2. Description of the Related Art

In complying with the requirements for miniaturization, weight reduction and implementation of higher densities of electronic parts, the variety and production amount of multilayer ceramic electronic parts such as multilayer ceramic capacitors are growing more and more, wherein the parts are produced by methods comprising the steps of: forming internal conductor films such as electrodes on ceramic green sheets; stacking such ceramic green sheets followed by subjecting them to compression bonding so as to obtain a raw laminate; and sintering ceramic components contained in the ceramic green sheets as well as electroconductive components contained in the internal conductor films at the same time by baking the raw laminate.

Ceramic green sheets for use in manufacturing such multilayer ceramic electronic parts are usually required to be made thinner. On the other hand, there are other occasions when the ceramic green sheets are required to be made thicker. At any rate, it is important that the ceramic green sheets have a thickness with little variation and do not have pores, etc., and that the ceramic raw material powder contained in the sheets has excellent dispersion characteristics. Regarding this point, a wet type sheet forming method for forming the ceramic green sheets is preferable to a dry type press molding method using a granulated ceramic raw material powder.

In the wet type sheet forming method, a ceramic slurry containing a ceramic raw material powder is prepared. For this purpose, conventionally, polyvinyl butyral or the like is used as a binder, and an organic solvent such as an alcohol or an aromatic solvent is used as a solvent.

However, use of an organic solvent creates great restrictions in the handling environment. Accordingly, a water-soluble binder, which is soluble in an aqueous solvent such as water itself, has been proposed recently. Among such water-soluble binders, a water-soluble acrylic binder that contains a relatively large amount of a hydrophobic component, tends to be easily adsorbed onto a ceramic raw material powder comprising a hydrophobic component, and therefore, is able to provide an ideal dispersion system with excellent dispersion characteristics. Furthermore, it has the advantage that the ceramic green sheets obtained from a slurry with the binder are less hygroscopic and thus show a smaller level of degradation due to environmental humidity. Furthermore, the same levels of sheet strength and elongation rate are obtained as those of ceramic green sheets using an organic binder such as polyvinyl butyral.

However, a water-soluble acrylic binder containing a conventional hydrophobic component generally has a high solution viscosity. A slurry using the binder also has a high viscosity, in general. Accordingly, the slurry has lower flow as well as degraded dispersion characteristics for a ceramic raw material powder, tending to make it difficult to obtain uniform ceramic green sheets.

A method for decreasing the viscosity of the slurry by increasing the amount of the aqueous solvent to be added or by decreasing the solution viscosity by decreasing the molecular weight of the binder has been proposed to solve these problems.

However, various problems will be encountered when the above-described methods are employed. For example, when ceramic green sheets having a thickness of not less than 60 μm are formed while increasing the amount of an aqueous solvent, the drying characteristics will be degraded, resulting in the generation of cracks on the obtained multilayer ceramic electronic parts. When a binder with a smaller molecular weight is employed, the mechanical properties of the ceramic green sheets such as tensile strength or elongation rate will be decreased.

SUMMARY OF THE INVENTION

Accordingly, it is an object of the present invention to provide a ceramic slurry composition with which the above-described problems can be solved, and also to provide a preferable method for manufacturing the composition.

The present invention is first directed to a ceramic slurry composition comprising a ceramic raw material powder, a water-soluble acrylic binder and an aqueous solvent, and is characterized in that the water-soluble acrylic binder has a weight average molecular weight of from about 10,000 to 500,000, and an inertial square radius of not more than 100 nm in the aqueous solvent in order to solve the above-described technical problems.

When such a ceramic slurry composition is used, it is possible to provide a ceramic slurry with a low viscosity by decreasing the solution viscosity of the binder alone and without decreasing the molecular weight of the water-soluble acrylic binder containing a hydrophobic component. Furthermore, the slurry has good dispersion characteristics for a ceramic raw material powder and good flow characteristics as well as excellent characteristics for forming ceramic green sheets. Thus, high-density ceramic green sheets can be obtained which have excellent drying characteristics.

Another aspect of the present invention is characterized in that the water-soluble acrylic binder contained in the ceramic slurry composition according to the present invention has a number of aggregated molecules as denoted by X and a second virial coefficient as denoted by Y in the range satisfying the following relationship: $Y \leq -0.0002X^2 - 0.0004X + 0.0051$ (where $X \geq 1$ and $Y \geq 0.00023$).

The present invention is also directed to a preferable method for manufacturing the ceramic slurry composition. The method for manufacturing the ceramic slurry composition is characterized in that it comprises the steps of:

obtaining a binder precursor by dispersing at least acrylic acid and an acrylate into a solvent; obtaining a water-soluble acrylic binder by subjecting the binder precursor to high pressure dispersion under a pressure of not less than about 100 kg/cm$^2$ and not more than about 1,750 kg/cm$^2$; and mixing the water-soluble acrylic binder, a ceramic raw material powder, and an aqueous solvent.

Other objects, advantages, and novel features of the invention will become more apparent from the following detailed description when taken in conjunction with the accompanying drawing and tables.

DESCRIPTION OF THE PREFERRED EMBODIMENTS

Figure 1:
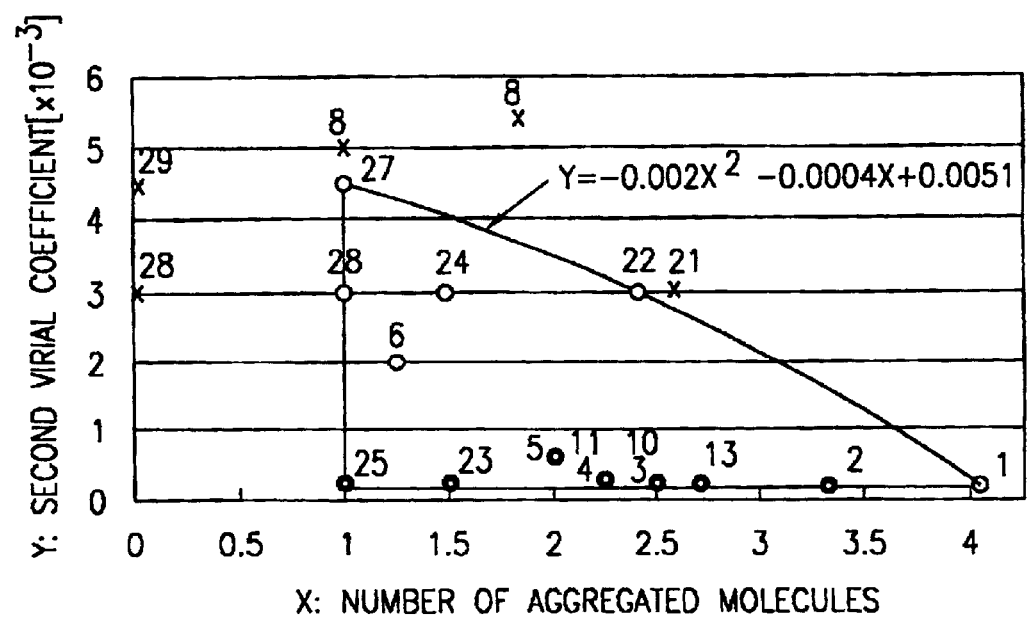
FIG. 1 is a graph showing the relationship between the numbers of aggregated molecules (X) and the second virial coefficients (Y) for various water-soluble acrylic binders prepared in the Examples.

Although the present invention will be described with reference to the following figure, tables and examples, it is to be understood that the invention is not limited to the precise embodiments described below, and various changes and modifications may be made to various usages and conditions without departing from the spirit and scope of the invention as described in the claims that follow.

A ceramic slurry composition according to the present invention is obtained by mixing a ceramic raw material powder, a water-soluble acrylic binder and an aqueous solvent, as described above. This water-soluble acrylic binder has a weight average molecular weight of from about 10,000 to 500,000, and has an inertial square radius of not more than about 100 nm in the aqueous solvent.

The water-soluble acrylic binder specified by the weight average molecular weight and the inertial square radius in the aqueous solvent as described above, can also be specified by the number of aggregated molecules and the second virial coefficient. That is, the water-soluble acrylic binder in the ceramic slurry composition according to the present invention has a number of aggregated molecules as denoted by X and a second virial coefficient as denoted by Y in the range satisfying the following relationship: $Y \leq -0.0002X^2 - 0.0004X + 0.0051$ (where $X \geq 1$ and $Y \geq 0.00023$).

X is specified as $X \geq 1$ since the molecular chain of the binder is thought to be shortened, with the result that the tenacity of the ceramic green sheets is lost, when X<1. The symbol Y is specified as $Y \geq 0.00023$ since the binder cannot act as a proper binder because of the occurrence of turbidity and deposition of undissolved materials, when Y<0.00023.

The above-described water-soluble acrylic binder is preferably a copolymer containing from about 93.0% to 99.0% by weight of an alkyl acrylate and/or an alkyl methacrylate that does not dissolve as a homopolymer in water at ambient temperatures and under normal pressure, and from about 1.0% to 7.0% by weight of a carboxyl group-containing unsaturated monomer.

Regarding the above-described alkyl acrylate and alkyl methacrylate that do not dissolve in water as homopolymers, the monomers for the polymers generally dissolve poorly in water. However, the monomers are mostly in the liquid state at ambient temperatures and therefore it is less easy to discern whether they are soluble in water or not, when compared with the homopolymers.

The alkyl acrylate and the alkyl methacrylate for use in the present invention preferably each have an alkyl group having from 1 to 8 carbon atoms.

At least one selected from the group consisting of methyl acrylate, ethyl acrylate, isopropyl acrylate, n-butyl acrylate, isobutyl acrylate, cyclohexyl acrylate, and 2-ethylhexyl acrylate is preferably used as the alkyl acrylate, for example.

Also, at least one selected from the group consisting of methyl methacrylate, ethyl methacrylate, isopropyl methacrylate, n-butyl methacrylate, isobutyl methacrylate, cyclohexyl methacrylate, and 2-ethylhexyl methacrylate is preferably used as the alkyl methacrylate, for example.

Furthermore, in the above-described carboxyl group-containing unsaturated monomer, an unsaturated carboxylic acid such as acrylic acid and methacrylic acid as well as a half ester thereof may be preferably used, for example. It may be a mixture of two or more of the monomers. Among them, it is especially preferable to use acrylic acid or methacrylic acid, which have the simplest structures.

A monomer that forms a homopolymer easily dissolvable in water may further be copolymerized with the water-soluble acrylic binder, which is a copolymer of reactive monomers. Examples of such a copolymerizable monomer are a (meth)acrylate having an alkylene moiety in the alkyl group, such as methoxymethyl (meth)acrylate and a methoxypolyethyleneglycol (meth)acrylate having an alkylene glycol in the alkyl group (where the number of the glycol repeating unit is 2, 3, 4, 8, or 24), and a (meth)acrylate having a hydroxyl group in the alkyl group, such as 2-hydroxyethyl (meth)acrylate and 2-hydroxybutyl (meth)acrylate, etc.

Furthermore, (meth)acrylonitrile, acrylamide, N-methylolacrylamide, styrene, ethylene, vinyl acetate, N-vinyl pyrolidone, glycidyl methacrylate, etc. can also be used as the other copolymerizable monomer.

When the water-soluble acrylic binder is neutralized to be a salt, the solubility in the aqueous solvent is increased, and the binder solution shows a pH around neutrality. Accordingly, it is easier to handle the binder. It is to be noted that it is preferable to use ammonium ions for the neutralization since the binder preferably has no component which leaves ash when incinerated. The easiest way to provide this ammonium ion is to use aqueous ammonia. However, any type of organic amine including primary, secondary, tertiary and quaternary amines may also be used. Monoethanol amine (primary), diethanol amine (secondary), triethanol amine (tertiary), etc. are examples.

As described above, the weight average molecular weight (Mw) of the water-soluble acrylic binder is selected to be in the range of from about 10,000 to 500,000. When the weight average molecular weight is less than about 10,000, the aggregation force of the binder is small and the strength of the ceramic green sheets is reduced. On the other hand, when the weight average molecular weight exceeds about 500,000, the solution viscosity of the binder and the viscosity of the slurry become large.

Furthermore, it is specified that the water-soluble acrylic binder should have an inertial square radius of not more than about 100 nm in the aqueous solvent as described above. When the radius exceeds about 100 nm, the solution viscosity of the binder and the slurry viscosity will be increased.

As long as the above-described conditions are satisfied, the water-soluble acrylic binder contained in the ceramic slurry composition according to the present invention can be manufactured by any known polymerization method, preferably by a solution polymerization method or the like. More preferably, the water-soluble acrylic binder can be manufactured by a method comprising the steps of: dispersing at least acrylic acid and an acrylate into a solvent to obtain a binder precursor; and subjecting the binder precursor to high pressure dispersion under a pressure of not less than about 100 kg/cm$^2$ and not more than about 1,750 kg/cm$^2$.

The above-described water-soluble acrylic binder can be present in the ceramic slurry composition according to the present invention at an arbitrarily selected content. For example, from about 1 to 25 parts by weight, preferably from about 5 to 15 parts by weight, as a solid component of the water-soluble acrylic binder can be added to about 100 parts by weight of the ceramic raw material powder.

Representative examples of materials used for the ceramic raw material powder are oxides such as alumina, zirconia, titanium oxide, barium titanate, lead titanate zirconate and manganese ferrite.

Furthermore, a water-soluble plasticizer such as polyethylene glycol and glycerol as well as a molding adjuvant such as a dispersion agent, an antifoamer and an antistatic agent, may be included, as necessary, in the ceramic slurry composition.

Example 1

Samples 1 to 6

First, barium carbonate ($BaCO_3$) and titanium oxide ($TiO_2$) were weighed out so that they were at a molar ratio of 1:1. They were subjected to wet blending with a ball mill and then to dehydration and drying. Then, they were subjected to calcination at a temperature of 1,000° C. for two hours, followed by crushing to provide a ceramic raw material powder.

A water-soluble acrylic binder was obtained according to the following method.

Two hundred grams of ethanol, 50 g of pure water and 2 g of azobis(4-cyanovaleric acid) as a polymerization initiator, were put into a one liter separable flask equipped with an agitator, a thermometer, a reflux condenser, a dropping funnel and a gas introduction tube. The mixture in the flask was heated to 65° C. under a stream of nitrogen gas.

Regarding the acrylic acid as the carboxyl group-containing unsaturated monomer and methyl acrylate as the alkyl acrylate, 0.5 g of the former was mixed with 99.5 g of the latter for Sample 1, 1.0 g of the former was mixed with 99.0 g of the latter for Sample 2, 4.0 g of the former was mixed with 96.0 g of the latter for Sample 3, 5.0 g of the former was mixed with 95.0 g of the latter for Sample 4, 6.0 g of the former was mixed with 94.0 g of the latter for Sample 5, and 9.0 g of the former was mixed with 91.0 g of the latter for Sample 6, each to make a mixture with a total amount of 100 g, as shown in the row of "Content of acrylic acid (% by weight)" in Table 1.

Each of the mixtures for Samples 1 to 6 was then added to the flask dropwise via the above-described dropping funnel for a duration of two hours. The mixture in the flask was then kept at the same temperature for 1 hour. Thereafter, the mixture was subjected to refluxing for two hours to complete the polymerization.

Next, the copolymers thus obtained were neutralized with aqueous ammonia. Then, while two milliliters per minute of pure water was added to each of the copolymers, ethanol was removed by means of azeotropic distillation with the water over two hours to leave binder precursors having 20.0% by weight of solid components. The binder precursors thus obtained were subjected to a treatment using a high pressure dispersing machine under a pressure of 300 kg/cm$^2$ as shown in the "Pressure at dispersion" row in Table 1 and at a handling rate of 300 mL/min for 10 times to obtain water-soluble acrylic binders.

Next, 100 parts by weight of the prepared ceramic raw material powder, 0.5 parts by weight as solid component of an ammonium polyacrylate dispersing agent (Mw: 1,000), 7 parts by weight as solid component of each of the water-soluble acrylic binders, 2 parts by weight of ethylene glycol as a plasticizer, and pure water in a total amount of 70 parts by weight, were poured into a ball mill with 650 parts by weight of zirconia balls having a diameter of 5 mm. Wet blending was carried out for 20 hours to provide a ceramic slurry composition.

Ceramic green sheets having a thickness of about 30 mm were formed by applying a doctor blade method to these ceramic slurry compositions. Next, these ceramic green sheets were subjected to drying at 80° C. for 30 minutes.

Sample 7

The same operations as those applied to Samples 1 to 6 were applied under the same conditions to form ceramic green sheets, except that 10.0 g of acrylic acid and 90.0 g of methyl acrylate were mixed and reacted while applying the same synthesizing method as was used for Samples 1 to 6 to form a water-soluble acrylic binder having a hydrophobic monomer as a main component, and it was used instead of the water-soluble acrylic binders used for Samples 1 to 6 described above.

Sample 8

The same operations as those applied to Samples 1 to 6 were applied under the same conditions to form ceramic green sheets, except that 10.0 g of acrylic acid and 90.0 g of methyl acrylate were mixed and reacted in a 100% ethanol solvent while applying the same synthesizing method as was used for Samples 1 to 6 to form a low molecular weight water-soluble acrylic binder having a hydrophobic monomer as the main component, and it was used instead of the water-soluble acrylic binders used for Samples 1 to 6 described above.

Various evaluations shown in each item of Table 1 below were carried out on the water-soluble acrylic binders, the ceramic slurry compositions, and the ceramic green sheets for Samples 1 to 8 obtained as described above.

TABLE 1

| Sample No. | 1 | 2 | 3 | 4 | 5 | 6 | 7 | 8 |
|---|---|---|---|---|---|---|---|---|
| | Content of acrylic acid (% by weight) | | | | | | | |
| | 0.5 | 1.0 | 4.0 | 5.0 | 7.0 | 9.0 | | |
| Solution viscosity of binder (mPa.s) | 4 | 5 | 6 | 8 | 20 | 1,000 | 15,000 | 25 |
| Weight average molecular weight | 180,000 | 200,000 | 200,000 | 200,000 | 200,000 | 200,000 | 200,000 | 6,000 |
| Absolute weight average molecular weight | 730,000 | 660,000 | 500,000 | 450,000 | 400,000 | 250,000 | 200,000 | 11,000 |
| Inertial square radius (nm) | less than 10 | 15 | 27 | 30 | 40 | 100 | 150 | 15 |
| Second virial coefficient (×10$^3$) | 0.23 | 0.25 | 0.28 | 0.30 | 0.60 | 2.00 | 5.00 | 5.40 |
| Number of aggregated molecules | 4.06 | 3.3 | 2.5 | 2.25 | 2 | 1.25 | 1 | 1.83 |
| Pressure at dispersion (kg/cm$^2$) | 300 | 300 | 300 | 300 | 300 | 300 | 300 | 300 |
| Slurry viscosity (mPa.s) | 8 | 9 | 10 | 12 | 25 | 200 | 1,000 | 15 |
| Density of formed sheet (g/cm$^3$) | 3.50 | 3.60 | 3.60 | 3.62 | 3.60 | 3.58 | 3.52 | 3.50 |
| Sheet tensile strength (MPa) | 1.00 | 1.50 | 2.30 | 2.70 | 3.00 | 4.50 | 4.85 | 3.70 |
| Sheet elongation rate (%) | 30.0 | 40.0 | 26.0 | 20.0 | 18.0 | 13.0 | 12.0 | 3.60 |

TABLE 1-continued

| Sample No. | 1 | 2 | 3 | 4 | 5 | 6 | 7 | 8 |
|---|---|---|---|---|---|---|---|---|
| Sheet tenacity | 30.0 | 60.0 | 59.8 | 54.0 | 54.0 | 58.5 | 58.2 | 13.0 |
| Drying time (s) | 70 | 80 | 88 | 90 | 100 | 150 | 180 | 100 |
| Result | ◯ | ⊙ | ⊙ | ⊙ | ⊙ | ◯ | x | x |

In Table 1, the "Weight average molecular weight" was determined for each water-soluble acrylic binder by Gel Permeation Chromatography (GPC), using tetrahydrofuran as the solvent, and polystyrene as the standard material.

The "Absolute weight average molecular weight", the "Inertial square radius", and the "Second virial coefficient" were determined on each water-soluble acrylic binder by means of a light scattering strength measurement, at concentrations of 2.0 g/L, 4.0 g/L, and 6.0 g/L regulated with an aqueous solvent. It is to be noted that the "Absolute weight average molecular weight" represents a molecular weight of aggregated molecules in an aqueous solution. The "Inertial square radius" represents the size of a molecule in an aqueous solution. The "Second virial coefficient" represents an interaction with water; the smaller the value, the less soluble the binder is in water.

The "Number of aggregated molecules" represents the number of molecules which aggregate to form a binder aggregate in water. It is determined by the calculation according to the equation: number of aggregated molecules= absolute weight average molecular weight/GPC weight average molecular weight, based on the absolute weight average molecular weight obtained in an aqueous solution, and by counting the weight average molecular weight obtained by means of the GPC measurement as one molecule.

The "Density of a formed sheet" was determined by punching out a formed ceramic green sheet to a rectangular shape with a size of 50 mm ×70 mm, calculating the volume by measuring the average thickness, and then dividing the calculated weight of the specimen by the volume. The better the dispersion characteristics, the larger is the "Density of a formed sheet".

The "Sheet tensile strength" and the "Sheet elongation rate" were determined by fixing both ends of a ceramic green sheet punched out as described above with chucks of a tensile tester (distance between the chucks: 30 mm), and by pulling the ceramic green sheet specimen at a constant speed (10 mm/min). More particularly, the "Sheet tensile strength" was determined by the maximum tensile strength value which appeared just before the ceramic green sheet specimen was torn apart. The "Sheet elongation rate" was determined by the value calculated by dividing the sheet elongation by the distance between the chucks. The higher the dispersion characteristics and the more tenacious the binder, the larger are these values.

These "Sheet tensile strength" and the "Sheet elongation rate" can be used as indices for the uniformity of the ceramic green sheets and the tenacity of the binders. Accordingly, it is preferable that both values are large at the same time. Table 1 also shows the "Sheet tenacity" obtained by multiplying the "Sheet tensile strength" and the "Sheet elongation rate" together.

The "Drying time" was determined by regulating the viscosity of each of the ceramic slurries of Samples 1 to 8 to the same value by adding water, and measuring the time required for drying the slurry at 130° C. The end point of the drying was determined by the time when the change in the water content was 0.15 mg/min or below.

As is understood from Table 1, Samples 1 to 6 show an improved combination of slurry viscosity and drying time in comparison with a conventional water-soluble acrylic binder having a hydrophobic component as a main component such as shown in the case of Sample 7, which had defects in that the slurry viscosity was high and the drying time was long, when the slurry was regulated to have the same viscosity.

Also, Samples 1 to 6 show improved sheet strength, sheet elongation rate or sheet tenacity in comparison with a conventional water-soluble acrylic binder having a lower molecular weight, so as to lower the slurry viscosity such as shown in the case of Sample 8, which had defects in that the sheet had a lower sheet tensile strength or a lower sheet elongation rate, resulting in a lower sheet tenacity value of 20.0 or below.

In particular, the weight average molecular weight (Mw) was not decreased by setting the content of acrylic acid to a value of from about 1.0% to 7.0% by weight, as shown in the cases of Samples 2 to 5. Accordingly, the mechanical properties of the ceramic green sheets such as density of the formed sheet, sheet tensile strength, sheet elongation rate, sheet tenacity and drying time, were not decreased. Furthermore, with reference to the results of Samples 2 to 5, it is understood that the copolymer molecules had a lower solubility in water, had a structure in which they were aggregated when dissolved in water, had a lower interaction therebetween, had an inertial square radius of not more than about 100 un, and therefore, had a lower solution viscosity of the binder as well as a lower slurry viscosity.

It is noted that the weight average molecular weight (Mw) is decreased when the content of acrylic acid is set to be less than 1% by weight, as shown in the case of Sample 1.

Furthermore, the solubility viscosity of the binder and the slurry viscosity become relatively large, and the drying time becomes longer, when the content of acrylic acid exceeds about 7.0% by weight, as shown in the results of sample 6.

Example 2

Samples 11 to 13

First, a ceramic raw material powder was obtained in the same way as shown in Example 1.

Furthermore, water-soluble acrylic binders were prepared by the following procedure.

200 g of methanol, 50 g of pure water and 2 g of azobis(4-cyanovaleric acid) as a polymerization initiator, were put into a one liter separable flask equipped with an agitator, a thermometer, a reflux condenser, a dropping funnel and a gas introduction tube. The mixture in the flask was heated to 65° C. under a stream of nitrogen gas.

Furthermore, as an alkyl acrylate and/or an alkyl methacrylate, methyl acrylate was used for Sample 11, ethyl methacrylate was used for Sample 12, and n-butyl acrylate was used for Sample 13, as shown in the row of "Alkyl (meth)acrylate" in Table 2.

Regarding the acrylic acid as a carboxyl group-containing unsaturated monomer, and the above-described alkyl acrylate and/or the above-described alkyl methacrylate, 5.0 g of the former was mixed with 95.0 g of the latter for Samples 11 to 13, each to make a mixture with a total amount of 100 g. Accordingly, Sample 11 was equivalent to Sample 4 in Example 1.

Each of the mixtures for Samples 11 to 13 was then added to the flask dropwise via the above-described dropping funnel for a duration of two hours. The mixture in the flask was then kept at the same temperature for 1 hour. Thereafter, the mixture was subjected to refluxing for two hours to complete the polymerization.

Next, the copolymers thus obtained were neutralized with aqueous ammonia. Then methanol was removed from the copolymers by means of heating and distillation at 70° C. over two hours while pure water was added to the copolymers at a rate of 2 mL/min, to leave water-soluble binder precursors having 20.0% by weight of the solid components. The binder precursors thus obtained were subjected to a treatment using a high pressure dispersing machine under a pressure of 300 kg/cm$^2$ as shown in the row of "Pressure at dispersion" in Table 2 and at a handling rate of 300 mL/min for 10 times to obtain a water-soluble acrylic binder.

Next, 100 parts by weight of the prepared ceramic raw material powder, 0.5 parts by weight as a solid component of an ammonium polyacrylate dispersing agent (Mw: 1,000), 7 parts by weight as a solid component of each of the water-soluble acrylic binders, 2 parts by weight of ethylene glycol as a plasticizer and pure water in a total amount of 70 parts by weight, were poured into a ball mill with 650 parts by weight of zirconia balls having a diameter of 5 mm. Wet blending was carried out for 20 hours to provide ceramic slurry compositions.

Ceramic green sheets having a thickness of about 30 mm were formed by applying a doctor blade method to these ceramic slurry compositions. Next, these ceramic green sheets were subjected to drying at 80° C. for 30 minutes.

Evaluations shown in each item of Table 2 below were carried out on the water-soluble acrylic binders, the ceramic slurry compositions and the ceramic green sheets for each of Samples 11 to 13 thus obtained, in the same way as for Example 1.

TABLE 2

| | Sample No. | | |
|---|---|---|---|
| | 11 | 12 | 13 |
| Alkyl (meth)acrylate | Methyl acrylate | Ethyl methacrylate | n-Butyl acrylate |
| Solution viscosity of binder (mPa.s) | 8 | 8 | 8 |
| Weight average molecular weight | 200,000 | 200,000 | 200,000 |
| Absolute weight average molecular weight | 450,000 | 500,000 | 540,000 |
| Inertial square radius (nm) | 30 | 30 | 30 |
| Second virial coefficient (×10$^{-3}$) | 0.30 | 0.28 | 0.26 |
| Number of aggregated molecules | 2.25 | 2.5 | 2.7 |
| Pressure at dispersion (kg/cm$^2$) | 300 | 300 | 300 |
| Slurry viscosity (mPa.s) | 12 | 12 | 11 |
| Density of formed sheet (g/cm$^3$) | 3.62 | 3.62 | 3.62 |
| Sheet tensile strength (MPa) | 2.70 | 2.00 | 1.50 |
| Sheet elongation rate (%) | 20.0 | 27.0 | 36.0 |
| Sheet tenacity | 54.0 | 54.0 | 54.0 |
| Drying time (s) | 90 | 90 | 90 |
| Result | ⊙ | ⊙ | ⊙ |

As is understood from Table 2, when ethyl methacrylate as shown in the case of Sample 12 or n-butyl acrylate as shown in the case of Sample 13 was used as an alkyl acrylate and/or an alkyl methacrylate instead of methyl acrylate, which was used in Example 1 and also for Sample 11, the copolymer molecules had a lower solubility in water, had a structure in which they were aggregated when dissolved in water, had a lower interaction therebetween and had an inertial square radius of not more than about 100 nm, resulting in a lower solution viscosity of the binder as well as a lower slurry viscosity, in the same way as in the case where methyl acrylate was used. Accordingly, it was possible to shorten the drying time and to increase the density of the formed sheet and the sheet tenacity.

Example 3

Samples 21 to 29

First, a ceramic raw material powder was obtained in the same way as shown in the cases of Examples 1 and 2.

Furthermore, the same operations and processes as those applied to Example 1 were applied, except that acrylic acid as the carboxyl group-containing unsaturated monomer and methyl acrylate as the alkyl acrylate were mixed so that the acrylic acid content was as shown in the row of "Content of acrylic acid (% by weight)" in Table 3, in order to obtain binder precursors for water-soluble acrylic binders.

Next, the binder precursors thus obtained were subjected to a treatment using a high pressure dispersing machine under pressures of 90 kg/cm$^2$, 100 kg/cm$^2$, 1,300 kg/cm$^2$, 1,750 kg/cm$^2$ and 2,000 kg/cm$^2$, as shown in the row of "Pressure at dispersion" in Table 3 and at a handling rate of 300 mL/min for 30 times to obtain water-soluble acrylic binders.

Next, 100 parts by weight of the prepared ceramic raw material powder, 0.5 parts by weight as a solid component of an ammonium polyacrylate dispersing agent (Mw: 1,000), 7 parts by weight as a solid component of each of the water-soluble acrylic binders, 2 parts by weight of ethylene glycol as a plasticizer and pure water in a total amount of 70 parts by weight, were poured into a ball mill with 650 parts by weight of zirconia balls having a diameter of 5 mm. Wet blending was carried out for 20 hours to obtain ceramic slurry compositions.

Ceramic green sheets having a thickness of about 30 mm were formed by applying a doctor blade method to these ceramic slurry compositions. Next, these ceramic green sheets were subjected to drying at 80° C. for 30 minutes.

Evaluations shown in each item of Table 3 were carried out on the water-soluble acrylic binders, the ceramic slurry compositions and the ceramic green sheets for each of Samples 21 to 29 thus obtained in the same way as for Example 1.

TABLE 3

| Sample No. | 21 | 22 | 23 | 24 | 25 | 26 | 27 | 28 | 29 |
|---|---|---|---|---|---|---|---|---|---|
| Content of acrylic acid (% by weight) | 20.0 | 20.0 | 1.0 | 20.0 | 1.0 | 20.0 | 30.0 | 20.0 | 30.0 |
| Solution viscosity of binder (mPa.s) | 2,000 | 1,000 | 5 | 100 | 4 | 10 | 900 | 3 | 50 |
| Weight average molecular weight | 200,000 | 200,000 | 200,000 | 200,000 | 200,000 | 200,000 | 200,000 | 6,000 (200,000) | 6,000 (200,000) |
| Absolute weight average molecular weight | 520,000 | 480,000 | 300,000 | 300,000 | 200,000 | 200,000 | 200,000 | 6,000 | 6,000 |
| Inertial square radius (nm) | 110 | 100 | 13 | 60 | 10 | 50 | 100 | 10 | 10 |
| Second virial coefficient ($\times 10^{-3}$) | 3.00 | 3.00 | 0.25 | 3.00 | 0.25 | 3.00 | 4.50 | 3.00 | 4.50 |
| Number of aggregated molecules | 2.6 | 2.4 | 1.5 | 1.5 | 1.0 | 1.0 | 1.0 | 0.03 | 0.03 |
| Pressure at dispersion (kg/cm$^2$) | 90 | 100 | 1,300 | 1,300 | 1,750 | 1,750 | 1,750 | 2,000 | 2,000 |
| Slurry viscosity (mPa.s) | 300 | 100 | 9 | 50 | 8 | 15 | 180 | 10 | 100 |
| Density of formed sheet (g/cm$^3$) | 3.62 | 3.62 | 3.62 | 3.62 | 3.62 | 3.62 | 3.62 | 3.62 | 3.62 |
| Sheet tensile strength (MPa) | 4.90 | 4.90 | 1.50 | 4.90 | 1.50 | 4.90 | 5.50 | 3.80 | 3.90 |
| Sheet elongation rate (%) | 11.0 | 11.0 | 40.0 | 11.0 | 40.0 | 11.0 | 9.0 | 3.6 | 2.0 |
| Sheet tenacity | 53.9 | 53.9 | 60.0 | 53.9 | 60.0 | 53.9 | 49.5 | 13.7 | 7.8 |
| Drying time (s) | 170 | 130 | 80 | 110 | 75 | 90 | 145 | 88 | 130 |
| Result | x | ○ | ⊙ | ○ | ⊙ | ○ | ○ | x | x |

In Table 3, the values in parentheses in the row of "Weight average molecular weight" for each of Samples 28 and 29 represent the weight average molecular weights of the binders before the high pressure dispersing step.

When the content of acrylic acid in the water-soluble acrylic binder is 1.0% by weight, which is within the range of from about 1.0% and 7.0% by weight, as shown in the cases of Samples 23 and 25, a high weight average molecular weight can be realized and the mechanical properties of the ceramic green sheets such as density of the formed sheet, sheet tensile strength, sheet elongation rate, sheet tenacity and drying time, can be improved. Furthermore, the inertial square radius can be reduced and the solution viscosity of the binder as well as the slurry viscosity can be made lower.

In comparison, in the cases of Samples 21, 22, 24, 26, 27, 28 and 29, which contained acrylic acid in amounts of 20.0% by weight and 30.0% by weight and therefore exceeded the range of from about 1.0% to 7.0% by weight, it was generally difficult or even impossible to decrease the solubility viscosity of the binder.

When the water-soluble acrylic binder is obtained by a method comprising the steps of: dispersing at least acrylic acid and an acrylate into a solvent to obtain a binder precursor and subjecting the binder precursor to high pressure dispersion, wherein a pressure of not less than about 100 kg/cm$^2$ and not more than about 1,750 kg/cm$^2$ is employed for the high pressure dispersion, the solubility viscosity and the slurry viscosity can be decreased without decreasing the molecular weight of the water-soluble acrylic binder to an undesirable extent, as shown in the cases of Samples 22, 24, 26 and 27. Therefore, it is possible to obtain ceramic green sheets with mechanical properties roughly comparable to those of Samples 23 and 25 as described above.

It is to be noted that when the pressure at the high pressure dispersing step is less than about 100 kg/cm$^2$, as shown in the case of Sample 21, the effect of the high pressure dispersion will not come out sometimes, depending on the composition. On the other hand, when the pressure at the high pressure dispersing step exceeds about 1,750 kg/cm$^2$ as shown in the cases of Samples 28 and 29, the molecular weight of the water-soluble acrylic binder will be decreased, resulting in lower properties including a lower sheet tenacity.

FIG. 1 shows the relationship between the numbers of aggregated molecules (X) and the second virial coefficients (Y) for various samples prepared in Examples 1 to 3 as described above.

In FIG. 1, the abscissa axis represents the number of aggregated molecules (X) and the ordinate axis represents the second virial coefficient (Y). The positions given by the numbers of aggregated molecules (X) and the second virial coefficients (Y) for the samples are denoted by the abscissas and the ordinates concerned, and are marked with symbols ⊙, ○, and x. The symbols ⊙, ○ and x correspond to marks ⊙, ○, and x which lie in the rows of "Result" in Tables 1 to 3. The symbols ⊙, ○, and x are accompanied by the sample numbers relative to each of the symbols. It is to be noted that the symbol ⊙ stands for excellent, the symbol ○ stands for good and the symbol x stands for unsatisfactory.

As is understood from FIG. 1, preferable samples which are denoted with marks ⊙ and ○, have numbers of aggregated molecules (X) and second virial coefficients (Y) in the range satisfying the relationship: $Y \leq -0.0002X^2 - 0.0004X + 0.0051$ (where $X \geq 1$ and $Y \geq 0.00023$).

By providing a ceramic slurry composition according to the present invention, wherein the water-soluble acrylic binder has a weight average molecular weight of from about 10,000 to 500,000, and has an inertial square radius of not more than about 100 nm in an aqueous solvent, or wherein the water-soluble acrylic binder has a number of aggregated molecules as denoted by X and a second virial coefficient as denoted by Y in the range satisfying the following relationship: $Y \leq -0.0002X^2 - 0.0004X + 0.0051$ (where $X \geq 1$ and $Y \geq 0.00023$), the solution viscosity of the water-soluble acrylic binder and the viscosity of the ceramic slurry composition obtained by using the binder, can be decreased. Accordingly, it is possible to prevent the density, tensile strength and elongation rate of the ceramic green sheets formed by using the ceramic slurry composition from decreasing, while the amount of water to be added can be decreased when regulating the viscosity of the ceramic slurry composition to the same level as that of a conventional ceramic slurry composition. The drying time for the ceramic green sheets can be shortened, accordingly.

A method for manufacturing a ceramic slurry composition according to the present invention comprises the steps of: obtaining a binder precursor by dispersing at least acrylic acid and an acrylate into a solvent and subjecting the binder precursor to high pressure dispersion under a pressure of not less than about 100 kg/cm$^2$ and not more than about 1,750 kg/cm$^2$, in order to obtain a water-soluble acrylic binder. It is, therefore, certainly possible to lower the solubility viscosity without decreasing the molecular weight of the water-soluble acrylic binder to an undesirable extent, even when the compositional ratio of the acrylic acid to the acrylate is adopted with which it is difficult to decrease the solution viscosity if a conventional method is employed. Accordingly, a ceramic slurry composition can be obtained easily, which can realize the above-described effects.

What is claimed is:

1. A ceramic slurry composition comprising:
   a ceramic raw material powder;
   a water-soluble acrylic binder; and
   an aqueous solvent,
   wherein said water-soluble acrylic binder has a weight average molecular weight of from about 10,000 to 500,000, and has an inertial square radius of not more than about 100 nm in the aqueous solvent.

2. A ceramic slurry composition according to claim 1, wherein said water-soluble acrylic binder has a number of aggregated molecules denoted by X and a second virial coefficient denoted by Y in the range satisfying the following relationship:

$$Y \leq -0.0002X^2 - 0.0004X + 0.0051$$

wherein $X \geq 1$ and $Y \geq 0.00023$.

3. The ceramic slurry composition according to claim 2, wherein said water-soluble acrylic binder is a copolymer containing from about 93 to 99% by weight of alkyl (meth) acrylate which does not dissolve in water as a homopolymer at ambient temperatures and under atmospheric pressure, and from about 1.0 to 7.0% by weight of a carboxyl group-containing unsaturated monomer.

4. The ceramic slurry composition according to claim 3, wherein the alkyl groups of said alkyl (meth)acrylate have from 1 to 8 carbon atoms.

5. The ceramic slurry composition according to claim 4, wherein said alkyl acrylate is at least one member selected from the group consisting of methyl acrylate, ethyl acrylate, isopropyl acrylate, n-butyl acrylate, isobutyl acrylate, cyclohexyl acrylate and 2-ethylhexyl acrylate.

6. The ceramic slurry composition according to claim 4, wherein said alkyl methacrylate is at least one selected from the group consisting of methyl methacrylate, ethyl methacrylate, isopropyl methacrylate, n-butyl methacrylate, isobutyl methacrylate, cyclohexyl methacrylate and 2-ethylhexyl methacrylate.

7. The ceramic slurry composition according to claim 3, wherein said carboxyl group-containing unsaturated monomer is an unsaturated carboxylic acid or partial ester thereof.

8. The ceramic slurry composition according to claim 7, wherein said carboxyl group-containing unsaturated monomer is (meth)acrylic acid or a half ester thereof.

9. The ceramic slurry composition according to claim 1, wherein said water-soluble acrylic binder is a neutralized salt.

10. The ceramic slurry composition according to claim 1, wherein said water-soluble acrylic binder is a copolymer containing from about 93 to 99% by weight of alkyl (meth) acrylate which does not dissolve in water as a homopolymer at ambient temperatures and under atmospheric pressure, and from about 1.0 to 7.0% by weight of a carboxyl group-containing unsaturated monomer.

11. The ceramic slurry composition according to claim 10, wherein the alkyl groups of said alkyl (meth)acrylate have from 1 to 8 carbon atoms.

12. The ceramic slurry composition according to claim 11, wherein said carboxyl group-containing unsaturated monomer is an unsaturated carboxylic acid or partial ester thereof.

13. The ceramic slurry composition according to claim 12, wherein said carboxyl group-containing unsaturated monomer is (meth)acrylic acid or a half ester thereof.

14. The ceramic slurry composition according to claim 10 in the form of a ceramic green sheet.

15. The ceramic slurry composition according to claim 4 in the form of a ceramic green sheet.

16. The ceramic slurry composition according to claim 3 in the form of a ceramic green sheet.

17. The ceramic slurry composition according to claim 2 in the form of a ceramic green sheet.

18. The ceramic slurry composition according to claim 1 in the form of a ceramic green sheet.

* * * * *